United States Patent
Luszcz et al.

(10) Patent No.: US 9,802,694 B2
(45) Date of Patent: Oct. 31, 2017

(54) COAXIAL ROTOR LOW-SPEED MIXING

(71) Applicant: Sikorsky Aircraft Corporation, Stratford, CT (US)

(72) Inventors: Matthew T. Luszcz, Hamden, CT (US); Matthew A. White, Milford, CT (US); Kenneth S. Wittmer, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/699,160

(22) Filed: Apr. 29, 2015

(65) Prior Publication Data

US 2015/0314855 A1    Nov. 5, 2015

Related U.S. Application Data

(60) Provisional application No. 61/987,227, filed on May 1, 2014.

(51) Int. Cl.
*B64C 13/16* (2006.01)
*B64C 27/10* (2006.01)
(Continued)

(52) U.S. Cl.
CPC ............ *B64C 13/16* (2013.01); *B64C 13/503* (2013.01); *B64C 27/10* (2013.01); *B64C 27/72* (2013.01); *G05D 1/0858* (2013.01); *Y02T 50/34* (2013.01)

(58) Field of Classification Search
CPC ........ B64C 27/006; B64C 27/08; B64C 27/72
(Continued)

(56) References Cited

U.S. PATENT DOCUMENTS 4,071,207 A    1/1978  Piasecki et al.
5,058,824 A *  10/1991 Cycon ................... B64C 39/024
                                                     244/17.13
(Continued)

FOREIGN PATENT DOCUMENTS

EP       1078308 B1     3/2013
WO    2013144508 A1    10/2013

OTHER PUBLICATIONS

Anonymous: "Lookup Table—Wikipedia, the free encyclopedia," Retrieved from the Internet: URL:https://en.wikipedia.org/w/index.php?title=Lookup_table&oldid=511083808 [retrieved on Jul. 14, 2015] 7 pgs.

(Continued)

*Primary Examiner* — Thomas G Black
*Assistant Examiner* — Wae Louie
(74) *Attorney, Agent, or Firm* — Cantor Colburn LLP

(57) ABSTRACT

A system and method for estimating rotor mixing commands for an aircraft includes receiving signals indicative of reference commands from one or more controllers; receiving signals indicative of airspeed and sideslip angle for the aircraft, the sideslip angle being indicative of a direction of flight for the aircraft; calculating a sine and cosine of the sideslip angle; determining gains for roll and pitch as a function of the airspeed, the determining including referencing a look-up table that indexes the gain constants with the airspeed; and determining the one or more rotor mixing commands from the determined gains, the one or more rotor mixing commands being applied synchronously to the rotors in the aircraft.

15 Claims, 3 Drawing Sheets

(51) Int. Cl.
  *B64C 13/50* (2006.01)
  *G05D 1/08* (2006.01)
  *B64C 27/72* (2006.01)
(58) Field of Classification Search
  USPC .......................... 701/3, 4; 244/17.11, 17.13
  See application file for complete search history.

(56) References Cited

U.S. PATENT DOCUMENTS

| | | | | |
|---|---|---|---|---|
| 6,145,428 | A * | 11/2000 | Gold | F41G 9/002 244/17.13 |
| 6,219,610 | B1 * | 4/2001 | Araki | B60T 8/1755 303/140 |
| 7,264,199 | B2 * | 9/2007 | Zientek | B64C 27/08 244/17.11 |
| 2009/0012658 | A1 * | 1/2009 | Cherepinsky | B64C 27/006 701/3 |
| 2011/0029159 | A1 * | 2/2011 | Puig | B64C 13/18 701/3 |
| 2015/0314855 | A1 * | 11/2015 | Luszcz | B64C 27/72 701/3 |

OTHER PUBLICATIONS

Search Report regarding related EP App. No. 15165701.2; dated Oct. 2, 2015; 10 pages.

Takahashi, M.D.: "H00 Helicopter Flight Control Low Design with and without Rotor State Feedback," Journal of Guidance and Control and Dynamics, AIAA, Reston, VA, US, vol. 17, No. 6, Nov. 1, 1194; 4 pgs.

* cited by examiner

COAXIAL ROTOR LOW-SPEED MIXING

CROSS-REFERENCE TO RELATED APPLICATIONS

This application claims the benefit of U.S. provisional patent application Ser. No. 61/987,227, filed May 1, 2014, the entire contents of which are incorporated herein by reference.

BACKGROUND

The subject matter disclosed herein relates generally to the field of rotary-wing aircraft and, more particularly, to a system and method for determining estimated rotor mixing command signals in order to decouple the rolling or pitching responses during low-speed forward flight.

DESCRIPTION OF RELATED ART

Many vehicles, including helicopters, use fly-by-wire (FBW) systems to control yaw, pitch and roll. In particular, for coaxial rotorcraft, yaw control is implemented through a differential collective blade pitch control (or differential collective) during low airspeed flight, which collectively pitches the rotor blades in one rotor with respect to the other coaxial rotor. However, during non-hovering flight (zero airspeed condition), the direction and magnitude of the air relative to the rotor induces a non-symmetric lift distribution and roll sensitivity as a function of collective on each rotor. In this condition, the advancing side of the rotor tends to create more lift than the retreating side when the collective pitch is changed. Since the advancing side of each rotor is on opposite sides and the differential collective induces twice the "undesirable" rolling moment when a differential collective yaw input is applied.

For example, in a counter-clockwise rotor in forward flight (advancing blade on the starboard side): Adding positive collective pitch increases the angle of attack equally across the entire rotor. Due to dynamic pressure differences on the advancing versus retreating sides, the advancing (RIGHT) side sees greater increase in lift. Larger increase in lift on advancing side results in increase in left rolling moment. For a clockwise rotor in forward flight (advancing blades on the port side): adding positive collective pitch increases angle of attack on both sides equally. Due to dynamic pressure differences on the advancing versus retreating sides, the advancing (LEFT) side sees greater increase in lift. Larger increase in lift on advancing side results in increase in RIGHT rolling moment.

Therefore, for a coaxial rotor applying positive GANG collective in forward flight: Adding positive collective pitch to counter-clockwise rotor increases lift on right (advancing) side relative to left (retreating) side. Adding positive collective pitch to clockwise rotor increases lift on left (advancing) side relative to right (retreating) side. For counter-clockwise rotor, larger increase in lift on advancing side results in increase of left rolling moment at the hub. For clockwise rotor, larger increase in lift on advancing side results in increase of right rolling moment at the hub. So, positive GANG collective increases lift on both rotors, biased to the advancing sides. Opposing roll moments balance out, with no net effect on flight path response.

For a coaxial rotor applying positive differential collective in forward flight: Adding positive collective pitch to counter-clockwise rotor increases lift on right (advancing) side relative to left (retreating) side. Adding negative collective pitch to clockwise rotor decreases lift on left (advancing) side relative to right (retreating) side. For counter-clockwise rotor, larger increase in lift on advancing side results in increase of left rolling moment at the hub. For clockwise rotor, larger decrease in lift on advancing side results in decrease of right rolling moment at the hub.

Improvements in decoupling these pitching or rolling moments or responses on the coaxial rotors would be well received in the art.

BRIEF SUMMARY

According to one aspect of the invention, a method for estimating rotor mixing commands for an aircraft includes receiving signals indicative of reference commands from one or more controllers; receiving signals indicative of airspeed and sideslip angle for the aircraft, the sideslip angle being indicative of a direction of flight for the aircraft; calculating a sine and cosine of the sideslip angle; determining gains for roll and pitch as a function of the airspeed, the determining including referencing a look-up table that indexes the gain constants with the airspeed; and determining the one or more rotor mixing commands from the determined gains, the one or more rotor mixing commands being applied synchronously to the rotors in the aircraft.

In addition to one or more of the features described above, or as an alternative, further embodiments could include receiving information indicative of an unmixed roll command signal, an unmixed pitch command signal, and a yaw command signal that produce a desired flight response for the aircraft.

In addition to one or more of the features described above, or as an alternative, further embodiments could include determining a mixed pitch command as a function of a differential collective to ganged pitch mixing signal.

In addition to one or more of the features described above, or as an alternative, further embodiments could include applying the differential collective to ganged pitch mixing signal for travel along a lateral axis of the aircraft.

In addition to one or more of the features described above, or as an alternative, further embodiments could include summing the differential collective to ganged pitch mixing signal with an unmixed pitch command signal.

In addition to one or more of the features described above, or as an alternative, further embodiments could include determining the differential collective to ganged pitch mixing signal as a function of a yaw command signal, the sine of the sideslip angle, the airspeed, and the determines gain pitch for airspeed.

In addition to one or more of the features described above, or as an alternative, further embodiments could include determining a mixed roll command as a function of a differential collective to ganged roll mixing signal.

In addition to one or more of the features described above, or as an alternative, further embodiments could include applying the differential collective to ganged roll mixing signal for travel along a longitudinal axis of the aircraft.

In addition to one or more of the features described above, or as an alternative, further embodiments could include summing the differential collective to ganged roll mixing signal with an unmixed roll command signal.

In addition to one or more of the features described above, or as an alternative, further embodiments could include determining the differential collective to ganged roll mixing signal as a function of a yaw command signal, the cosine of the sideslip angle, the airspeed, and the gain roll constant for airspeed.

According to another aspect of the invention, a system for estimating mixing commands for an aircraft includes a processor and memory. The processor receives signals indicative of reference commands from one or more controllers, receives signals indicative of airspeed and sideslip angle for the aircraft and determines a sine and cosine of the sideslip angle. The processor determines gain constants for roll and pitch as a function of the airspeed and determines the one or more rotor mixing commands as a function of the determined gain constants. Also, the memory indexes gain constants for roll and pitch with the airspeed.

In addition to one or more of the features described above, or as an alternative, further embodiments could include receiving information indicative of an unmixed roll command signal, an unmixed pitch command signal, and a yaw command signal that produce a desired flight response for the aircraft.

In addition to one or more of the features described above, or as an alternative, further embodiments could include determining the one or more rotor mixing commands from a mixed pitch command as a function of a differential collective to ganged pitch mixing signal.

In addition to one or more of the features described above, or as an alternative, further embodiments could include applying the differential collective to ganged pitch mixing signal during travel along a lateral axis of the aircraft.

In addition to one or more of the features described above, or as an alternative, further embodiments could include determining the mixed pitch command by summing the differential collective to ganged pitch mixing signal with an unmixed pitch command signal.

In addition to one or more of the features described above, or as an alternative, further embodiments could include determining the differential collective to ganged pitch mixing signal as a function of a yaw command signal, the sine of the sideslip angle, the airspeed, and the determined gain pitch for airspeed.

In addition to one or more of the features described above, or as an alternative, further embodiments could include determining the one or more rotor mixing commands by determining a mixed roll command as a function of a differential collective to ganged roll mixing signal.

In addition to one or more of the features described above, or as an alternative, further embodiments could include applying the differential collective to ganged roll mixing signal for travel along a longitudinal axis of the aircraft.

In addition to one or more of the features described above, or as an alternative, further embodiments could include determining the mixed roll command by summing the differential collective to ganged roll mixing signal with an unmixed roll command signal.

In addition to one or more of the features described above, or as an alternative, further embodiments could include determining the differential collective to ganged roll mixing signal as a function of a yaw command signal, the cosine of the sideslip angle, the airspeed, and the determined gain roll for airspeed.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
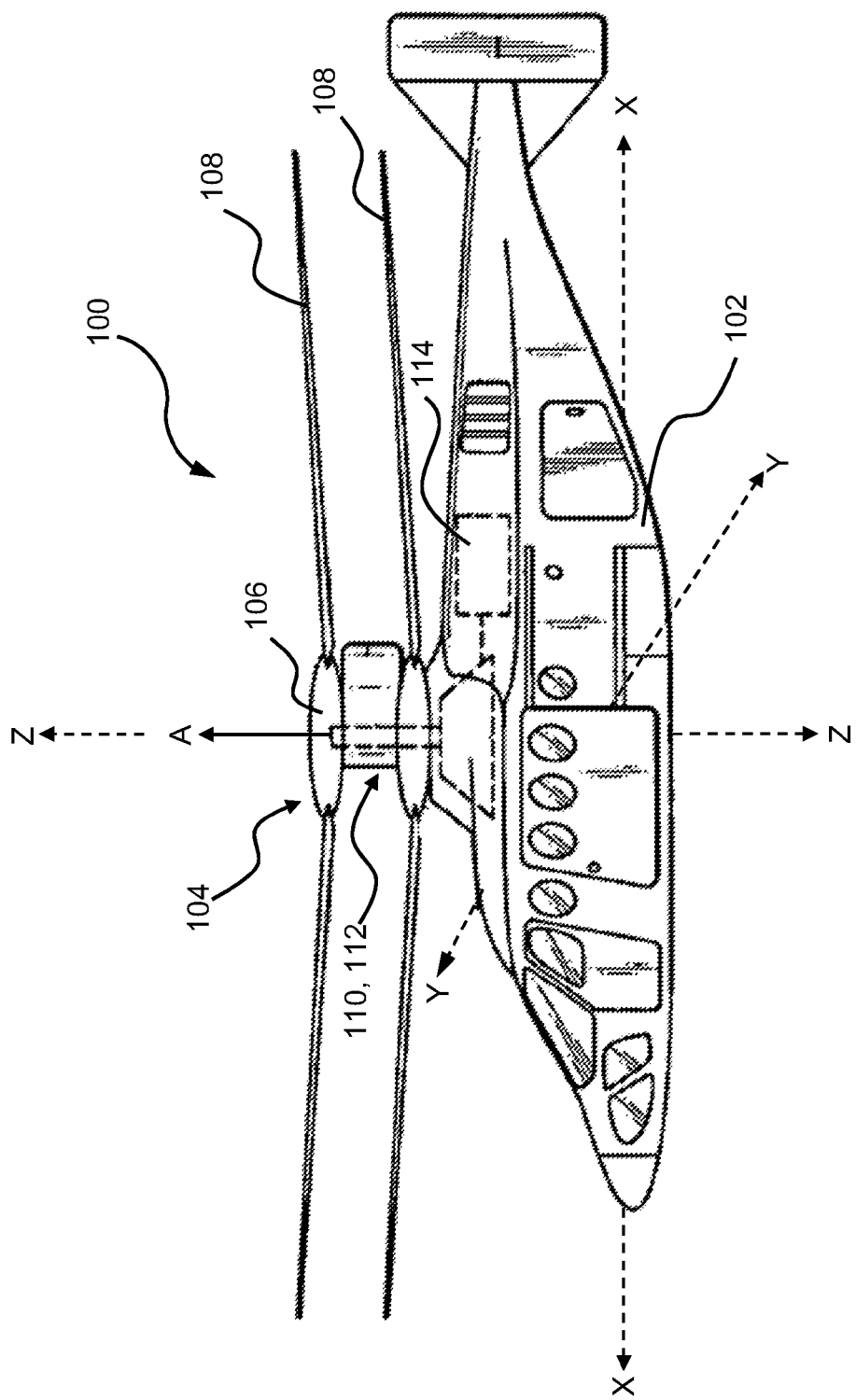
FIG. 1 is a perspective view of an exemplary rotary wing aircraft according to an embodiment of the invention.

Referring now to the drawings, FIG. 1 illustrates a general perspective view of an exemplary vehicle in the form of a vertical takeoff and landing (VTOL) rotary-wing aircraft 100 according to an embodiment of the invention. As illustrated, the rotary-wing aircraft 100 includes a dual, counter-rotating rotor system 104, which is attached to an airframe 102. The rotor system 104 includes a rotor hub 106 with a plurality of blades 108 attached. The rotor hub 106 includes a rotating main rotor shaft 110 and a counter-rotating main rotor shaft 112 that each rotate about axis A. The rotor hub 106 is driven to rotate by one or more engines 114 through one or more gearboxes (not shown). The aircraft 100 also includes a flight control computer 202 (shown in FIG. 2) that may interpret positions of collective and cyclic controllers and sensors 210 and receive direction and magnitude of wind relative to the plurality of blades 108 in order to implement a coaxial rotor low-speed mixing algorithm. The coaxial rotor low-speed algorithm produces, for example, a command for displacing one or more servos and linkages that are connected to the rotor hub 106 in order to drive the blades 108 on the rotor system 104 while taking into account the asymmetric moments on the plurality of rotor blades 108. These commands correspond to forward and backward motion of the aircraft 100 relative to the wind-frame (i.e., airspeed), rotation of the aircraft 100 about axis X-X (i.e., roll), sideways rotation of the airframe 102 about axis Z-Z (i.e., yaw), and a rotation of the airframe 102 about axis Y-Y (i.e., pitch). Although a particular configuration of a rotary-wing aircraft 100 is illustrated and described in the disclosed embodiments, other configurations and/or machines, such as high speed compound rotary-wing aircraft with supplemental translational thrust systems, dual contra-rotating coaxial rotor system aircraft, tilt-rotors, tilt-wing aircraft, tandem rotor aircraft, and unmanned rotary wing aircraft with any of the previous configurations will also benefit from embodiments of the invention.

Figure 2:
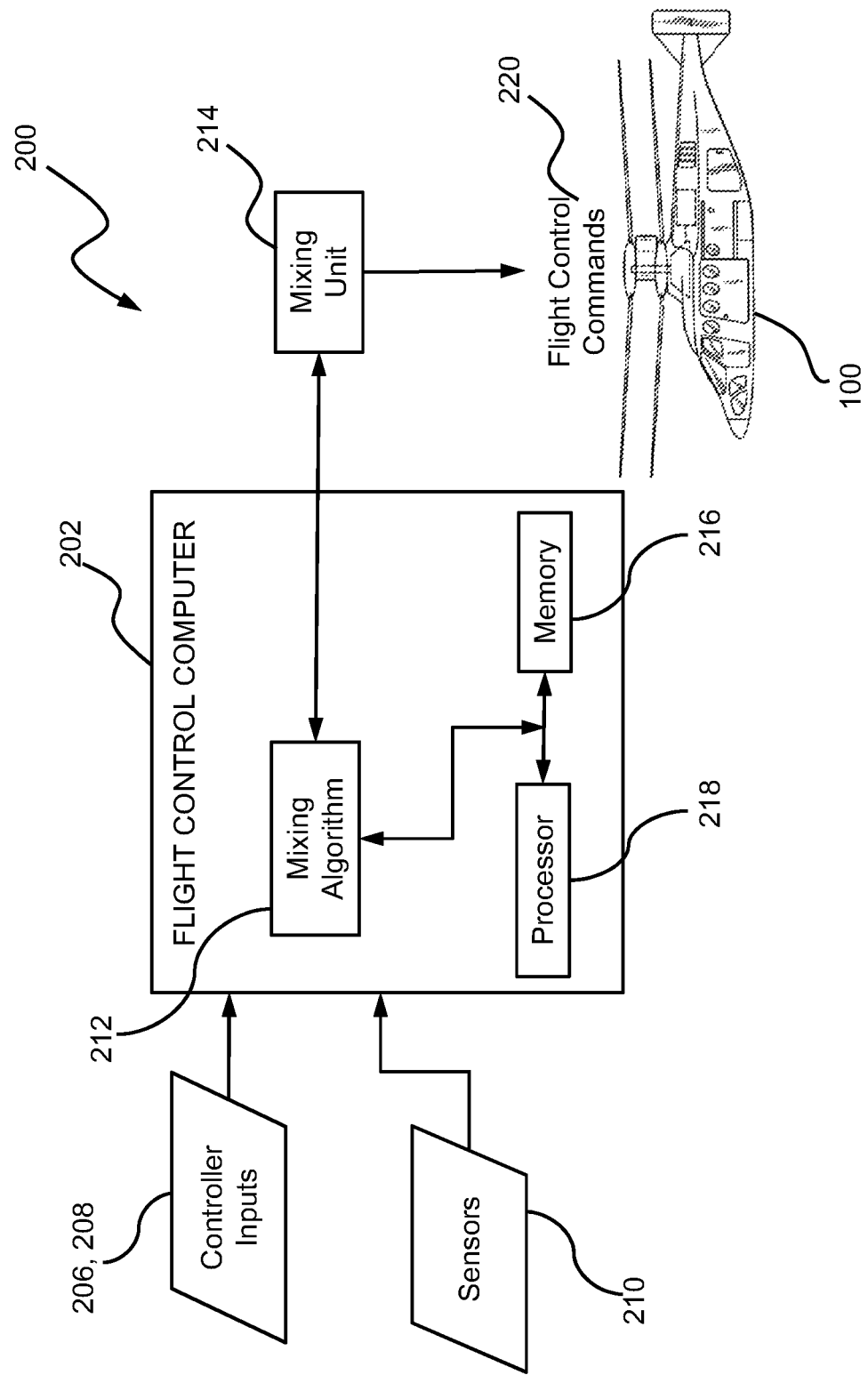
FIG. 2 is a schematic diagram of an exemplary computing system that is used with the rotary wing aircraft of FIG. 1 according to an embodiment of the invention.

FIG. 2 illustrates a schematic block diagram of a fly-by-wire (FBW) flight control system 200 (also referred to as FBW system 200) for the rotary-wing aircraft 100 according to an exemplary embodiment. As illustrated, the FBW system 200 implements a coaxial rotor low-speed mixing algorithm 212 (or low-speed mixing algorithm 212), which shapes the pilot's controller and displacement commands and produces a desired stability, response, and flight augmentation. In an embodiment, the FBW system 200 may determine an estimated mixed roll and pitch command in order to produce a desired proportional decoupling response in a proper orientation for pitch or roll moments induced on the plurality of rotors 108 (FIG. 1). The FBW system 200 includes a computing system such as a flight control computer (FCC) 202. The FCC 202 can receive reference commands from a collective controller 206 and a cyclic controller 208, and sensed parameter signals from a plurality of sensors 210 including operating conditions such as lateral acceleration, attitude, and angular rate as well as magnitude and direction of wind speed relative to the rotor 104 in rotary-wing aircraft 100 in order to produce the desired stability response and flight augmentation. The collective controller 206 and the cyclic controller 208 may take various forms including sidearm controllers, a yaw pedal system or other such flight controllers.

In an embodiment, the FCC 202 receives information such as, for example, a magnitude of the wind frame relative to the rotary-wing aircraft 100 from the sensors 210, a direction of the wind relative to rotary-wing aircraft 100 from the sensors 210, lateral acceleration, aircraft attitude, and aircraft angular rate, and interprets reference commands such as, for example, displacement positions of controllers 206, 208 based on reference commands in order to determine yaw and pitch command signals. In an embodiment, the FCC 202 receives information on airspeed for rotary-wing aircraft 100 while traveling during non-hover flight and a relative direction of the airspeed to the rotary-wing aircraft 100. The FCC 202 inputs the received information into the low-speed mixing algorithm 212 in order to determine or calculate an estimated mixed pitch and roll command that forms part of the augmented flight control commands 220. It is to be appreciated that mixing is used whenever differential collective is used for yaw control. These estimated mixed pitch and roll commands are provided to a mixing unit 214, which communicates these commands to rotary-wing aircraft 100 for the displacement of servos on the rotor system 104 (FIG. 1).

Also shown in FIG. 2, the FCC 202 includes a memory 216. The memory 216 stores the low-speed mixing algorithm 212 as executable instructions that is executed by a processor 218. The instructions may be stored or organized in any manner and at any level of abstraction, such as in connection with the execution of the low-speed mixing algorithm 212. The processor 218 may be any type of processor (CPU), including a general purpose processor, a digital signal processor, a microcontroller, an application specific integrated circuit, a field programmable gate array or the like. Also, in embodiments, memory 216 may include random access memory (RAM), read only memory (ROM), or other electronic, optical, magnetic or any other computer readable medium onto which is stored the mixing algorithm described below. It is to be appreciated that the low-speed mixing algorithm 212 described below in FIG. 3 may be implemented not only for aircraft travel along a longitudinal axis of rotary-wing aircraft 100 but also for aircraft travel along the lateral axis or for combinations of longitudinal and lateral travel.

Figure 3:
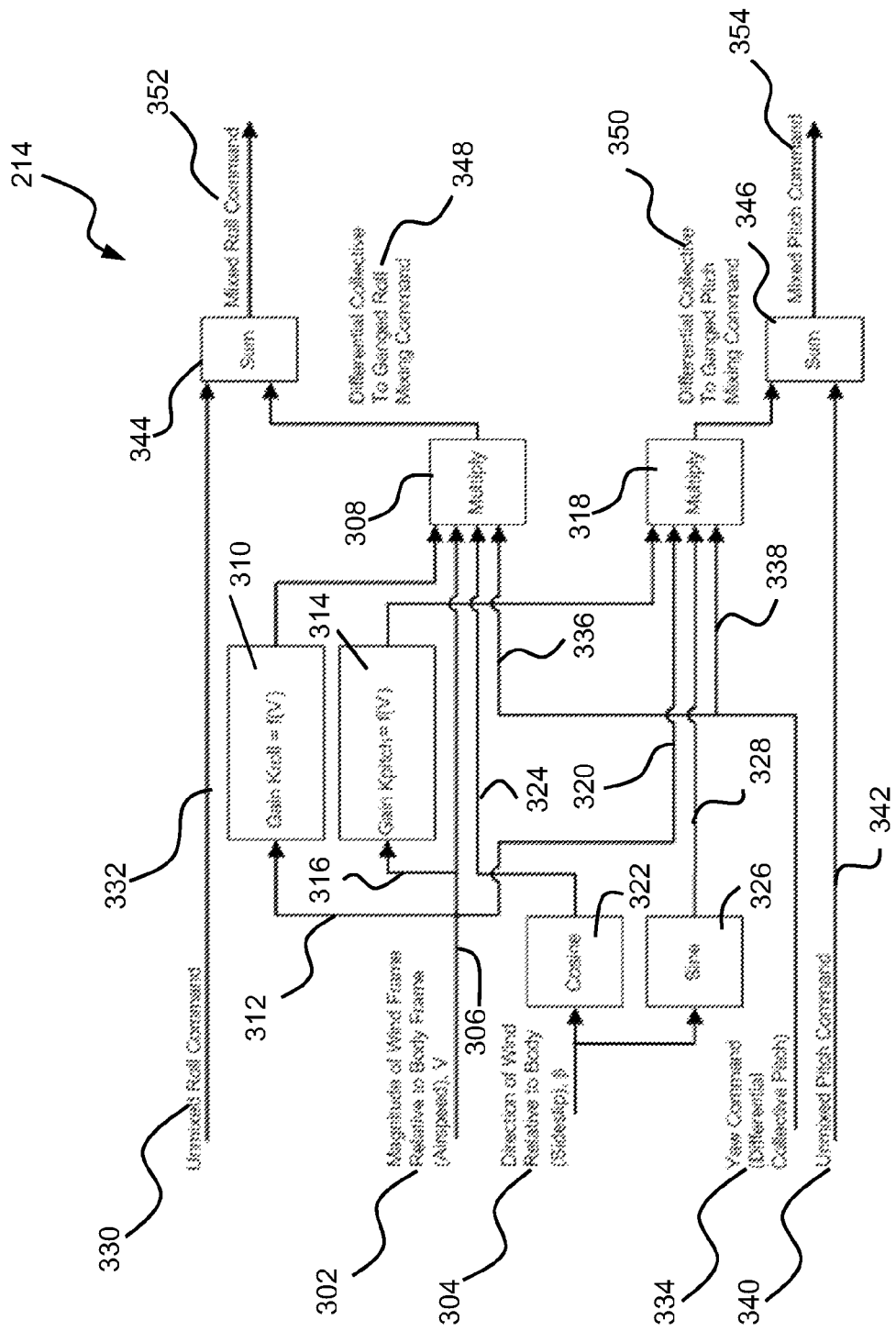
FIG. 3 illustrates a schematic block diagram for implementing the mixing algorithm according to an embodiment of the invention.

FIG. 3 illustrates a schematic block diagram for implementing the low-speed mixing algorithm 212 by FCC 202 (FIG. 2) according to an embodiment of the invention and as such, FIG. 2 is also being referenced in the description of low-speed mixing algorithm 212.

In an embodiment, implementation of the low-speed mixing algorithm 212 begins when the FCC 202 (FIG. 2) receives and stores the aircraft's sensed parameters from sensors 210 (FIG. 2) such as, for example, a signal 302 that represents an estimate of a magnitude of wind relative to the airframe 102 (i.e., airspeed incident on the airframe 102) and a signal 304 which represents an estimate of a direction of wind (i.e., sideslip angle on the airframe 102) relative to airframe 102. The signals 302, 304 are representative of a direction of travel for the rotary-wing aircraft 100 (FIG. 1). The signal 302 is applied to each of a multiplier block 308 on line 306, a roll angle fixed gain block 310 on line 312, a pitch angle fixed gain block 314 on line 316, and a multiplier block 318 on line 320.

The fixed gain blocks 310, 314 include gain values, which are maintained in one or more lookup tables in memory 216 (FIG. 2). Particularly, the gain blocks 310, 314 include one or more lookup tables which store gains for the respective signals 302, 304 representing the magnitude of wind relative to the rotor 104 and the direction of wind relative to the rotor 104. These gains may be predetermined or derived from, in some non-limiting examples, simulated data or flight test data.

The multiplier block 308 also receives a signal 322 on line 324 that is representative of a cosine of the signal 304 and multiplier block 318 receives a signal 326 on line 328 that is representative of a sine of the signal 304. Additionally, flight control commands that are generated based on reference commands are applied to the multiplier blocks 308, 318 and summation blocks 344, 346. Particularly, a signal representative of a roll command 330 based on reference commands is applied to summation block 344 on line 332, a signal representative of a differential collective pitch (i.e., yaw) command 334 based on reference commands is applied to each of a multiplier block 308 on line 336 and multiplier block 318 on line 338, and a signal representative of a pitch command 340 based on reference commands is applied to summation block 346 on line 342.

The multiplier block 308 multiplies its inputs of gain 310, airspeed 302, cosine signal 322 and yaw command 334 to produce a signal 348 that is representative of a differential collective to ganged roll mixing signal. The differential collective to ganged roll mixing signal is representative of a proportional decoupling response to the rolling moments that is applied for travel along a longitudinal axis of the rotary-wing aircraft 100 (FIG. 1). The output of summation block 344 is signal 352 which is a sum of the roll command 330 and the decoupling signal 348. The signal 352 represents a mixed roll command that is applied synchronously to the rotor system 104 (FIG. 1) in order to decouple the roll moments that are induced in the rotary-wing aircraft 100 as described above. Similarly, the multiplier block 318 multiplies its inputs of gain 314, airspeed 302, sine signal 326 and yaw command 334 to produce a signal 350 that is representative of a differential collective to ganged pitch mixing signal. The differential collective to ganged pitch mixing signal is representative of a decoupling response to the pitching moments that is applied for travel along a lateral axis of the rotary-wing aircraft 100 (FIG. 1). The output of summation block 346 is signal 354 which is a sum of the pitch command 340 and the decoupling signal 350. The signal 354 represents a mixed pitch command that is applied synchronously to the rotor system 104 (FIG. 1) in order to decouple the pitch moments that are induced in the rotary-wing aircraft 100 as described above.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for estimating rotor mixing commands for an aircraft, comprising:
receiving signals indicative of reference commands from one or more controllers;
receiving signals from one or more sensors indicative of airspeed and sideslip angle for the aircraft, the sideslip angle being indicative of a direction of flight for the aircraft;
calculating a sine and cosine of the sideslip angle;
determining gains for roll and pitch as a function of the airspeed, the determining includes referencing a look-up table that indexes the gain with the airspeed; and
determining the one or more rotor mixing commands from the determined gain, the one or more rotor mixing commands being applied synchronously to the rotors in the aircraft.

2. The method of claim 1, wherein the receiving of information indicative of displacement commands further comprises receiving information indicative of an unmixed roll command signal, an unmixed pitch command signal, and a yaw command signal that produce a desired flight response for the aircraft.

3. The method of claim 1, wherein the determining of the one or more rotor mixing commands further comprises determining a mixed pitch command as a function of a differential collective to ganged pitch mixing signal.

4. The method of claim 3, further comprising applying the differential collective to ganged pitch mixing signal for travel along a lateral axis of the aircraft.

5. The method of claim 3, wherein the determining of the mixed pitch command further comprises summing the differential collective to ganged pitch mixing signal with an unmixed pitch command signal.

6. The method of claim 3, further comprising determining the differential collective to ganged pitch mixing signal as a function of a yaw command signal, the sine of the sideslip angle, the airspeed, and the determines gain pitch for airspeed.

7. The method of claim 1, wherein the determining of the one or more rotor mixing commands further comprises determining a mixed roll command as a function of a differential collective to ganged roll mixing signal.

8. The method of claim 7, further comprising applying the differential collective to ganged roll mixing signal for travel along a longitudinal axis of the aircraft.

9. The method of claim 7, wherein the determining of the mixed roll command further comprises summing the differential collective to ganged roll mixing signal with an unmixed roll command signal.

10. The method of claim 7, further comprising determining the differential collective to ganged roll mixing signal as a function of a yaw command signal, the cosine of the sideslip angle, the airspeed, and the gain roll constant for airspeed.

11. A system for estimating mixing commands for an aircraft, comprising:
a processor that receives signals indicative of reference commands from one or more controllers, receives signals from one or more sensors indicative of airspeed and sideslip angle for the aircraft and determines a sine and cosine of the sideslip angle, wherein the sideslip angle being indicative of a direction of flight for the aircraft; and
a memory that indexes gain constants for roll and pitch with the airspeed;
wherein the processor determines gains for roll and pitch as a function of the airspeed; and
wherein the processor determines the one or more rotor mixing commands as a function of the determined gains and communicates the one or more rotor mixing command to a servo of a rotor system associated with the processor, the servo being displaced in response to the one or more rotor mixing commands.

12. The system of claim 11, wherein the processor receives information indicative of an unmixed roll command signal, an unmixed pitch command signal, and a yaw command signal that produce a desired flight response for the aircraft.

13. The system of claim 11, wherein the processor determines the one or more rotor mixing commands from a mixed pitch command as a function of a differential collective to ganged pitch mixing signal.

14. The system of claim 13, wherein the processor determines the one or more rotor mixing commands by determining a mixed roll command as a function of a differential collective to ganged roll mixing signal.

15. The system of claim 14, wherein the processor applies the differential collective to ganged pitch mixing signal during travel along a lateral axis of the aircraft and applies the differential collective to ganged roll mixing signal for travel along a longitudinal axis of the aircraft.

* * * * *